United States Patent
Roth et al.

(10) Patent No.: US 7,230,042 B2
(45) Date of Patent: Jun. 12, 2007

(54) FLAME RETARDANT POLYMER COMPOSITIONS CONTAINING HYDROXYLAMINE ESTERS

(75) Inventors: Michael Roth, Lautertal (DE); Dirk Simon, Mutterstadt (DE); Grant Leslie, East Lothian (GB); Peter Nesvadba, Marly (CH); Roswell Easton King, Pleasantville, NY (US); Nikolas Kaprinidis, New York, NY (US)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 10/511,853

(22) PCT Filed: Apr. 10, 2003

(86) PCT No.: PCT/EP03/03726

§ 371 (c)(1),
(2), (4) Date: May 9, 2005

(87) PCT Pub. No.: WO03/087211

PCT Pub. Date: Oct. 23, 2003

(65) Prior Publication Data

US 2005/0203222 A1    Sep. 15, 2005

(30) Foreign Application Priority Data

Apr. 17, 2002 (EP) .................................. 02405310

(51) Int. Cl.
*C08K 5/34* (2006.01)
*C08K 5/51* (2006.01)
*C08K 5/17* (2006.01)
*C08K 5/18* (2006.01)

(52) U.S. Cl. .......... 524/99; 524/149; 524/238; 524/239; 524/240; 524/367; 524/467

(58) Field of Classification Search ............ 524/149, 524/238, 239, 240, 367, 467, 99, 267
See application file for complete search history.

(56) References Cited

U.S. PATENT DOCUMENTS

| 5,096,950 | A | 3/1992 | Galbo et al. ............... 524/99 |
| 5,124,378 | A | 6/1992 | Behrens et al. ........... 524/95 |
| 5,393,812 | A | 2/1995 | Haley et al. .............. 524/91 |
| 2003/0216494 | A1 | 11/2003 | Roth et al. ............... 524/95 |

FOREIGN PATENT DOCUMENTS

| EP | 0344321 | 12/1989 |
| WO | 98/51735 | 11/1998 |
| WO | 99/00450 | 1/1999 |
| WO | 99/05108 | 2/1999 |
| WO | 01/70868 | 9/2001 |
| WO | 01/90113 | 11/2001 |
| WO | 02/092653 | 11/2002 |
| WO | 03/029332 | 4/2003 |

*Primary Examiner*—Kriellion Sanders
(74) *Attorney, Agent, or Firm*—Tyler A. Stevenson

(57) ABSTRACT

The instant invention pertains to a thermoplastic organic polymer containing a conventional flame retardant and a hydroxylamine ester, in particular a tetraalkyl piperidine hydroxylamine ester. Further aspects of the invention are the use of hydroxylamine esters as flame retardants and a method for improving flame retardancy of a thermoplastic organic polymer.

9 Claims, No Drawings

FLAME RETARDANT POLYMER COMPOSITIONS CONTAINING HYDROXYLAMINE ESTERS

The instant invention pertains to a thermoplastic organic polymer containing a conventional flame retardant and a hydroxylamine ester, in particular a tetraalkyl piperidine hydroxylamine ester. Further aspects of the invention are the use of hydroxylamine esters as flame retardants and a process for improving flame retardancy of a thermoplastic organic polymer.

U.S. Pat. No. 5,393,812 describes polyolefin compositions which are made flame retardant by addition of a halogenated hydrocarbyl phosphate or phosphonate ester flame retardant and stabilized against degradation by UV-light with an alkoxyamine functional hindered amine. EP-A-792911 proposes the use of an alkoxyamine functional hindered amine for improving the flame retardant properties of a polyolefin. The activity of alkoxyamine functional hindered amines alone as flame retardants is disclosed in WO 99/00450. There is, however, no disclosure in the prior art suggesting hydroxylamine esters as flame retardants together with a conventional flame retardant.

The instant hydroxylamine esters, for example, provide a synergist system for heavy metals (e.g. antimony oxide replacement in ABS). Good flame retardancy can be achieved by using less classic flame retardant agent in the presence of the instant hydroxylamine esters.

Accordingly the instant invention provides a flame retardant composition which comprises
(a) a thermoplastic polymeric substrate,
(b) a mixture of
(i) a hydroxylamine ester having a structural element of formula (I) or formula (I') or a polymeric hydroxylamine ester having a repetitive structural unit of formula (II) or (II')

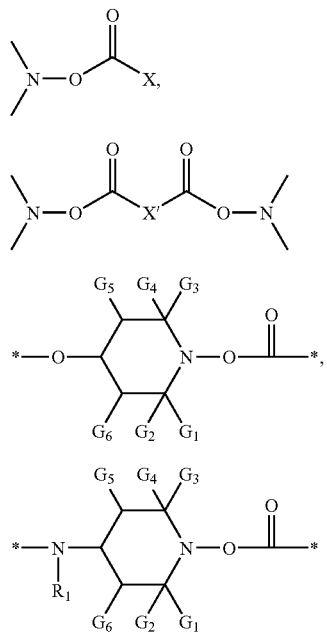

wherein
X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;
X' is a direct bond or $C_1$-$C_{36}$alkylene, $C_2$-$C_{36}$alkenylene, $C_2$-$C_{36}$alkinylene, —($C_1$-$C_6$alkylene)-phenylene-($C_1$-$C_6$alkylene)- or a group from a dimer acid
$G_1$, $G_2$, $G_3$ and $G_4$ are independently alkyl of 1 to 4 carbon atoms, or $G_1$ and $G_2$ together and
$G_3$ and $G_4$ together, or $G_1$ and $G_2$ together or $G_3$ and $G_4$ together are pentamethylene;
$G_5$ and $G_6$ are independently hydrogen or $C_1$-$C_4$ alkyl;
$R_1$ is $C_1$-$C_{12}$alkyl, $C_5$-$C_7$cycloalkyl, $C_7$-$C_9$aralkyl, $C_2$-$C_{18}$alkanoyl, $C_3$-$C_5$alkenoyl or benzoyl; and
(ii) a flame retardant compound selected from the group consisting of halogenated, phosphorus, boron, silicon and antimony compounds, metal hydroxides, metal hydrates, metal oxides and mixtures thereof.

Classical flame retardants are well known and largely items of commerce.

The halogenated flame retardants useful as component (ii) in compositions of the present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. No. 4,579,906 (e.g. col. 3, lines 30-41), U.S. Pat. No. 5,393,812; see also Plastics Additives Handbook, Ed. by H. Zweifel, 5$^{th}$ Ed., Hanser Publ., Munich 2001, pp. 681-698.

In a preferred embodiment of the invention the hydroxylamine ester is of formula (Ia) or (I'a)

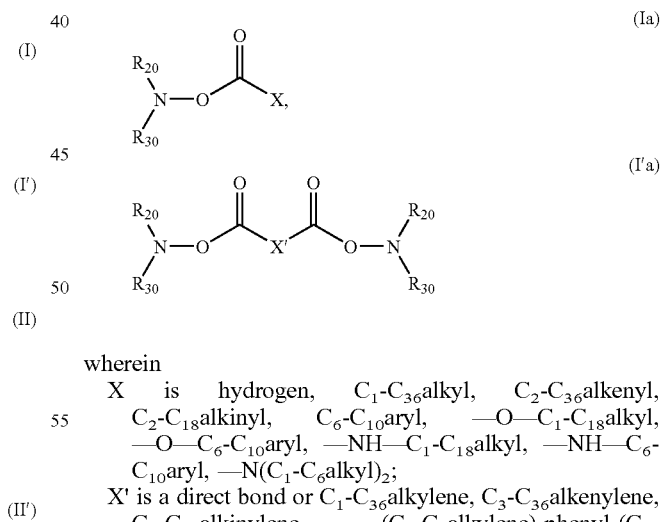

wherein
X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;
X' is a direct bond or $C_1$-$C_{36}$alkylene, $C_3$-$C_{36}$alkenylene, $C_3$-$C_{36}$alkinylene, —($C_1$-$C_6$alkylene)-phenyl-($C_1$-$C_6$alkylene) or a group from a dimer acid
$R_{20}$ and $R_{30}$ independently are unsubstituted $C_1$-$C_{18}$alkyl, $C_2$-$C_{18}$alkenyl, $C_2$-$C_{18}$alkinyl or with halogen, CN, NO$_2$ or —COOR$_{40}$ substituted or with O or NR$_{40}$ interrupted $C_1$-$C_{18}$alkyl, $C_2$-$C_{18}$alkenyl or $C_2$-$C_{18}$alkinyl;
$R_{40}$ is H, phenyl or $C_1$-$C_{18}$alkyl; or
$R_{20}$ and $R_{30}$ together with the nitrogen atom to which they are bound form a 5 or 6 membered ring which may be interrupted by a nitrogen or oxygen atom and which may be substituted by one or more $C_1$-$C_6$alkyl groups, carboxyl groups, $C_1$-$C_{18}$alkoxy groups, $C_1$-$C_{18}$alkanoyloxy groups.

It is preferred, that $R_{20}$ and $R_{30}$ together with the nitrogen atom to which they are bound form a 5 or 6 membered ring, particularly a 6 membered ring.

For instance the structural element of formula (I) is a structural element of formula (Ib)

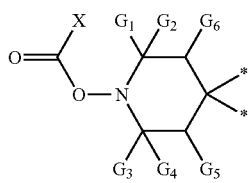
(Ib)

wherein * denotes a bond and the other substituents are as defined above.

Examples are given below wherein the structural element of formula (Ib) is of formulae A to S

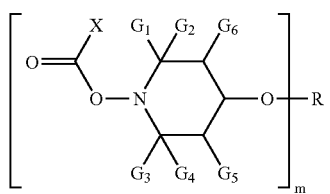
(A)

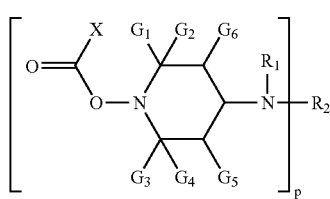
(B)

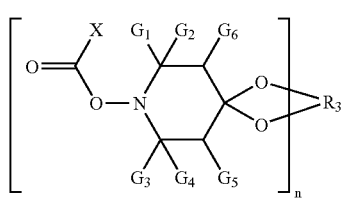
(C)

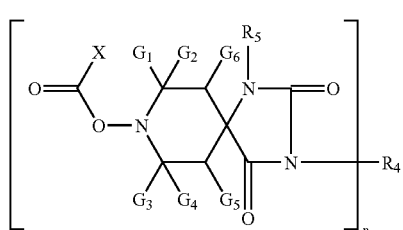
(D)

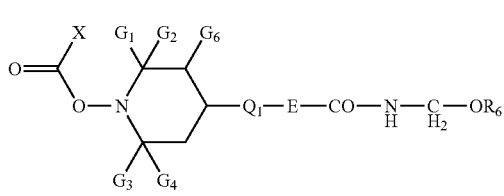
(E)

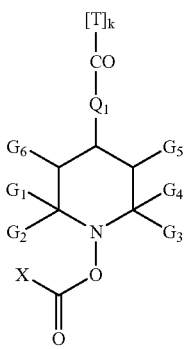
(F)

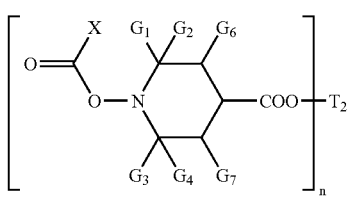
(G)

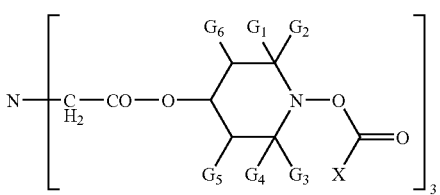
(H)

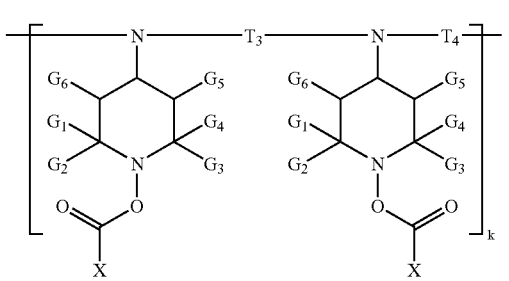
(I)

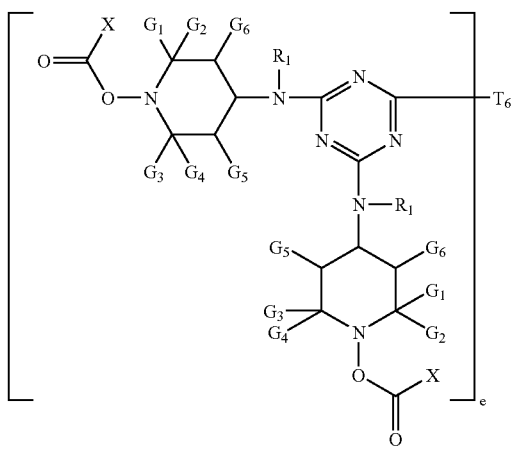
(K)

-continued (L) 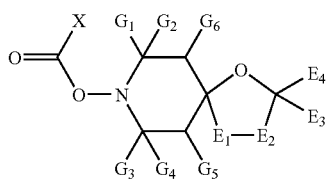

(M) 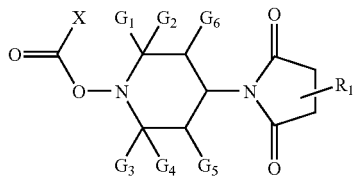

(N) 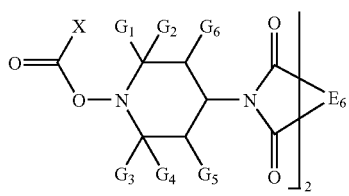

(O) 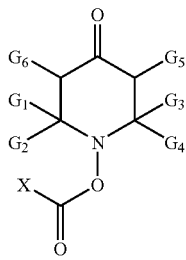

(P) 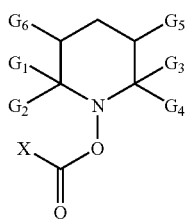

(Q) 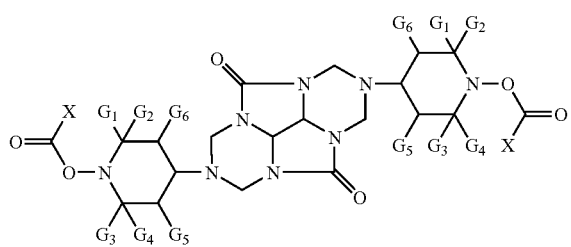

(R) 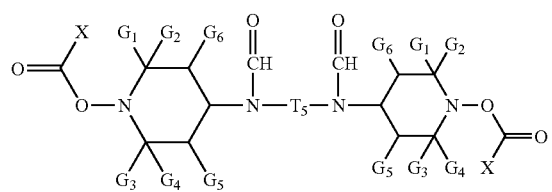

(S) 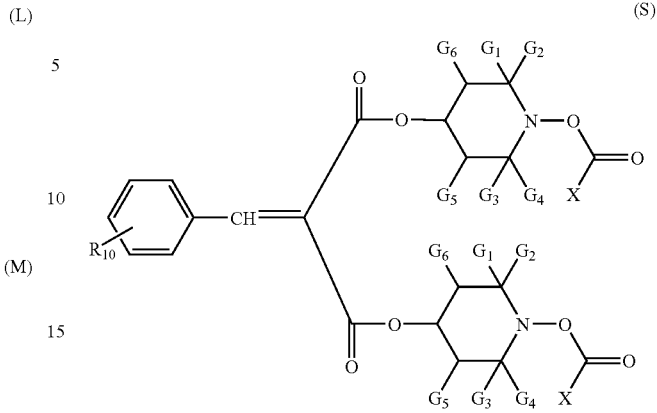

wherein $G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$-$C_4$ alkyl;

R, if m is 1, is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms, where each dicarboxylic acid may be substituted in the aliphatic, cycloaliphatic or aromatic moiety by one or two —$COOZ_{12}$ groups; or R is a divalent radical of a phosphorus-containing acid or a divalent silyl radical;

R, if m is 3, is a trivalent radical of an aliphatic, cycloaliphatic or aromatic tricarboxylic acid, which may be substituted in the aliphatic, cycloaliphatic or aromatic moiety by —$COOZ_{12}$, of an aromatic tricarbamic acid or of a phosphorus-containing acid, or is a trivalent silyl radical, R, if m is 4, is a tetravalent radical of an aliphatic, cycloaliphatic or aromatic tetracarboxylic acid;

p is 1, 2 or 3, $R_1$ is $C_1$-$C_{12}$alkyl, $C_5$-$C_7$cycloalkyl, $C_7C_8$aralkyl, $C_2$-$C_{18}$alkanoyl, $C_3$-$C_5$alkenoyl or benzoyl;

when p is 1, $R_2$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z- or —CONH-Z wherein Z is hydrogen, methyl or phenyl; or when p is 2, $R_2$ is $C_2$-$C_{12}$alkylene, $C_6$-$C_{12}$-arylene, xylylene, a —CH$_2$CH(OH)CH$_2$—O—B—O—CH$_2$CH(OH)CH$_2$— group, wherein B is $C_2$-$C_{10}$alkylene, $C_6$-$C_{15}$arylene or $C_6$-$C_{12}$cycloalkylene; or, provided that $R_1$ is not alkanoyl, alkenoyl or benzoyl, $R_2$ can also be a divalent acyl radical of an aliphatic, cycloaliphatic or aromatic dicarboxylic acid or dicarbamic acid, or can be the group —CO—; or $R_1$ and $R_2$ together when p is 1 can be the cyclic acyl radical of an aliphatic or aromatic 1,2- or 1,3-dicarboxylic acid; or $R_2$ is a group

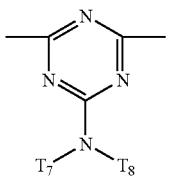

where $T_7$ and $T_8$ are independently hydrogen, alkyl of 1 to 18 carbon atoms, or $T_7$ and $T_8$ together are alkylene of 4 to 6 carbon atoms or 3-oxapentamethylene;

when p is 3, $R_2$ is 2,4,6-triazinyl;

when n is 1, $R_3$ is $C_2$-$C_8$alkylene or hydroxyalkylene or $C_4$-$C_{36}$acyloxyalkylene; or when n is 2, $R_3$ is (—CH$_2$)$_2$C(CH$_2$—)$_2$;

when n is 1, $R_4$ is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$-alkoxyalkyl, $C_6$-$C_{10}$-aryl, glycidyl, a group of formula —(CH$_2$)$_m$—COO-Q or of the formula —(CH$_2$)$_m$—O—CO-Q wherein m is 1 or 2 and Q is $C_1$-$C_4$-alkyl or phenyl; or when n is 2, $R_4$ is $C_2$-$C_{12}$alkylene, $C_6$-$C_{12}$-arylene, a group —CH$_2$CH(OH)CH$_2$—O-D-O—CH$_2$CH(OH)CH$_2$— wherein D is $C_2$-$C_{10}$alkylene, $C_6$-$C_{15}$arylene or $C_6$-$C_{12}$cycloalkylene, or a group —CH$_2$CH(OZ$_1$)CH$_2$—(OCH$_2$CH(OZ$_1$)CH$_2$)$_2$— wherein $Z_1$ is hydrogen, $C_1$-$C_{18}$alkyl, allyl, benzyl, $C_2$-$C_{12}$alkanoyl or benzoyl;

$R_5$ is hydrogen, $C_1$-$C_{12}$alkyl, allyl, benzyl, glycidyl or $C_2$-$C_6$alkoxyalkyl;

$Q_1$ is —N(R$_7$)— or —O—;

E is $C_1$-$C_3$alkylene, the group —CH$_2$CH(R$_8$)—O— wherein $R_8$ is hydrogen, methyl or phenyl, the group —(CH$_2$)$_3$—NH— or a direct bond;

$R_7$ is $C_1$-$C_{18}$alkyl, $C_5$-$C_7$cycloalkyl, $C_7$C$_{12}$aralkyl, cyanoethyl, $C_6$-$C_{10}$aryl, the group —CH$_2$CH(R$_8$)—OH; or a group of the formula

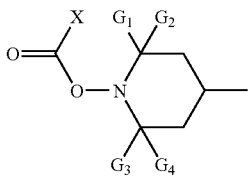

or a group of the formula

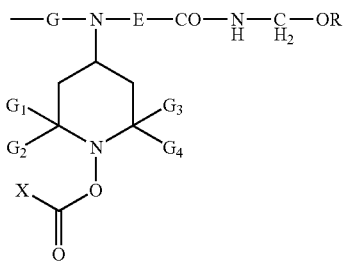

wherein G is $C_2$-$C_6$alkylene or $C_6$-$C_{12}$arylene and R is as defined above; or $R_7$ is a group —E—CO—NH—CH$_2$—OR$_6$;

$R_6$ is hydrogen or $C_1$-$C_{18}$alkyl;

formula (F) denotes a recurring structural unit of a oligomer where T is ethylene or 1,2-propylene, or is a repeating structural unit derived from an α-olefin copolymer with an alkyl acrylate or methacrylate;

k is 2 to 100;

$R_{10}$ is hydrogen, $C_1$-$C_{12}$alkyl or $C_1$-$C_{12}$alkoxy;

$T_2$ has the same meaning as $R_4$;

$T_3$ and $T_4$ are independently alkylene of 2 to 12 carbon atoms, or $T_4$ is a group

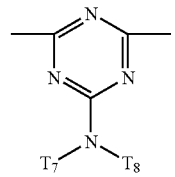

$T_5$ is $C_2$-$C_{22}$alkylene, $C_5$-$C_7$cycloalkylene, $C_1$-$C_4$alkylenedi($C_5$-$C_7$cycloalkylene), phenylene or phenylenedi($C_1$-$C_4$alkylene);

$T_6$ is

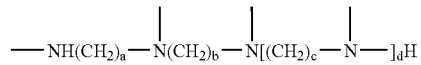

where a, b and c are independently 2 or 3, and d is 0 or 1;

e is 3 or 4;

$T_7$ and $T_8$ are independently hydrogen $C_1$-$C_{18}$alkyl, or $T_7$ and $T_8$ together are $C_4$-$C_6$alkylene or 3-oxapenthamethylene;

$E_1$ and $E_2$ are —CO— or —N(E$_5$)—, where $E_5$ is hydrogen, $C_1$-$C_{12}$alkyl or $C_4$-$C_{22}$alkoxycarbonylalkyl;

$E_3$ is hydrogen, alkyl of 1 to 30 carbon atoms, phenyl, naphthyl, said phenyl or said naphthyl substituted by chlorine or by alkyl of 1 to 4 carbon atoms, or phenylalkyl of 7 to 12 carbon atoms, or said phenylalkyl substituted by alkyl of 1 to 4 carbon atoms;

$E_4$ is hydrogen, alkyl of 1 to 30 carbon atoms, phenyl, naphthyl or phenylalkyl of 7 to 12 carbon atoms; or $E_3$ and $E_4$ together are polymethylene of 4 to 17 carbon atoms, or said polymethylene substituted by up to four alkyl groups of 1 to 4 carbon atoms;

$E_6$ is an aliphatic or aromatic tetravalent radical;

and X is as defined above.

A dimer acid contains for example the following structures as a mixture

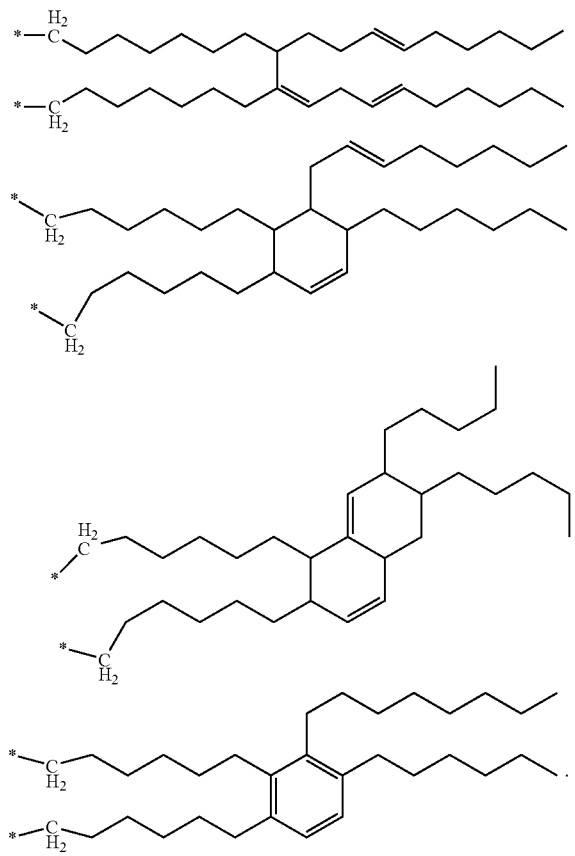

* denotes the bonding to the carbonyl group. These dimer acids are known and for example described in Ullmanns Encyclopedia of Industrial Chemistry, 5th completely rev. ed. 1987, Weinheim, VCH; Vol. A8, p 535-536; executive ed.: W. Gerhartz; senior ed.:Y. S. Yamamoto; ed. L. Kaudy, R. Pfefferkorn, J. F. Rounsaville.

$C_3$-$C_{12}$alkenyl is for example propenyl, butenyl, pentenyl, hexenyl, heptenyl, octenyl, dodecenyl including their isomers.

$C_6$-$C_{10}$aryl is phenyl or naphthyl, preferably phenyl.

$C_7$-$C_9$aralkyl is for example benzyl, phenylpropyl, α,α-dimethylbenzyl or α-methylbenzyl.

$C_2$-$C_{18}$alkyl interrupted by at least one O atom is for example —CH$_2$—CH$_2$—O—CH$_2$—CH$_3$, —CH$_2$—CH$_2$—O—CH$_3$ or —CH$_2$—CH$_2$—O—CH$_2$—CH$_2$—CH$_2$—O—CH$_2$—CH$_3$. It is preferably derived from polyethlene glycol. A general description is —((CH$_2$)$_a$—O)$_b$—H/CH$_3$, wherein a is a number from 1 to 6 and b is a number from 2 to 10.

If R is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If R is a monovalent silyl radical, it is, for example, a radical of the formula —(C$_j$H$_{2j}$)—Si(Z')$_2$Z", in which j is an integer in the range from 2 to 5, and Z' and Z", independently of one another, are C$_1$-C$_4$alkyl or C$_1$-C$_4$alkoxy.

If R is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl)malonyl or bicycloheptenedicarbonyl radical or a group of the formula

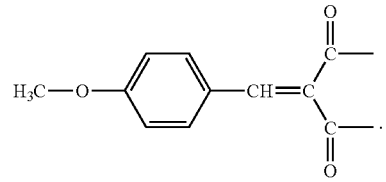

If R is a trivalent radical of a tricarboxylic acid, it is, for example, a trimellitoyl, citryl or nitrilotriacetyl radical.

If R is a tetravalent radical of a tetracarboxylic acid, it is, for example, the tetravalent radical of butane-1,2,3,4-tetracarboxylic acid or of pyromellitic acid.

If R is a divalent radical of a dicarbamic acid, it is, for example, hexamethylenedicarbamoyl or 2,4-toluylenedicarbamoyl radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

Any $C_2$-$C_{12}$alkylene radicals are, for example, ethylene, propylene, 2,2-dimethylpropylene, tetramethylene, hexamethylene, octamethylene, decamethylene or dodecamethylene.

Any $C_6$-$C_{15}$arylene substituents are, for example, o-, m- or p-phenylene, 1,4-naphthylene or 4,4'-diphenylene.

$C_6$-$C_{12}$cycloalkylene is, in particular, cyclohexylene.

Hydroxyl-, cyano-, alkoxycarbonyl- or carbamide-substituted $C_1$-$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

For instance the hydroxylamine ester is of formula A, B or C and the substituents are as defined above.

In a specific embodiment of the invention the hydroxylamine ester is of formula A, B or C

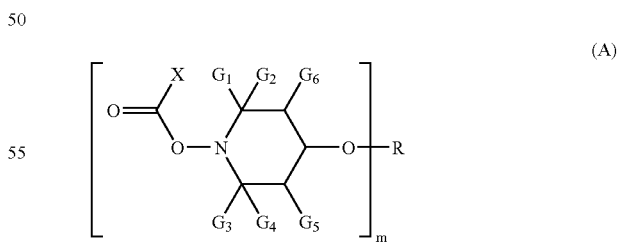

(A)

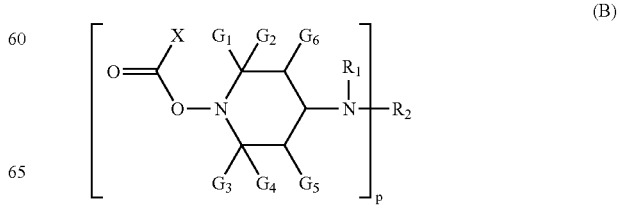

(B)

-continued

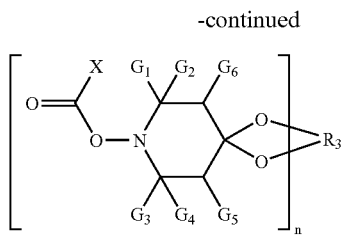

wherein

G₁, G₂, G₃ and G₄ are methyl or G₁ and G₃ are methyl and G₂ and G₄ are ethyl or G₁ and G₂ are methyl and G₃ and G₄ are ethyl;

G₅ and G₆ are independently hydrogen or methyl;

m is 1;

R is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —COOZ₁₂ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

p is 1;

R₁ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

R₂ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH₂CH(OH)-Z or of the formula —CO-Z- or —CONH-Z wherein Z is hydrogen, methyl or phenyl;

n is 1,

R₃ is $C_2$-$C_8$alkylene or hydroxyalkylene or $C_4$-$C_{36}$acyloxyalkylene and X is hydrogen, $C_1$-$C_{36}$alkyl or $C_6$-$C_{10}$aryl.

Examples for R₃ being $C_4$-$C_{36}$acyloxyalkylene are mentioned in Table A, compounds 135, 137 and 138.

Most preferably the hydroxylamine ester is of formula A or C wherein

G₁, G₂, G₃ and G₄ are methyl or G₁ and G₃ are methyl and G₂ and G₄ are ethyl;

G₅ and G₆ are independently hydrogen or methyl;

m is 1;

R is hydrogen, $C_1$-$C_{18}$alkyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

n is 1;

R₃ is $C_2$-$C_8$alkylene or hydroxyalkylene or $C_4$-$C_{36}$acyloxyalkylene and X is hydrogen, $C_1$-$C_{36}$alkyl or $C_6$-$C_{10}$aryl.

In another embodiment the hydroxylamineester is a oligomer or polymer obtainable by reacting a dicarboxylic acid or a dicarboxylic acid derivative with a compound of formula A1 or B1 or by reacting a diisocyanate with a compound of formula A1

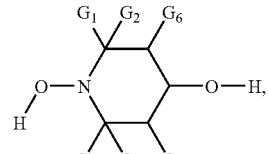

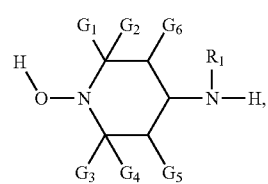

wherein the substituents G₁, G₂, G₃, G₄, G₅, G₆ and R₁ are as defined above.

The resulting polymers are polyesters, polyurethanes or polyester-urethanes. The polymers may be homopolymers or copolymers which are composed of aliphatic, cycloaliphatic or aromatic dicarboxylic acids and optionally a further diol.

The polymers can be prepared by direct esterification (PTA process) and also by transesterification (DMT process). Any of the known catalyst systems may be used for the preparation.

The aliphatic dicarboxylic acids can contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms and the aromatic and cycloaliphatic hydroxycarboxylic acids 7 to 14 carbon atoms.

When further diols are used these may be aliphatic, cycloaliphatic or aromatic diols. The aliphatic diols can contain 2 to 12 carbon atoms, the cycloaliphatic diol 5 to 8 carbon atoms and the aromatic diols 6 to 16 carbon atoms.

Polyoxyalkylene glycols having molecular weights from 150 to 40000 may also be used.

Aromatic diols are those in which two hydroxyl groups are bound to one or to different aromatic hydrocarbon radicals.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, for example oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are: In particular terephthalic acid, isophthalic acid, o-phthalic acid, and 1,3-, 1,4-, 2,6- or 2,7-naphthalenedicarboxylic acid, 4,4'-diphenyldicarboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p-(carboxylphenyl)methane or bis-p-(carboxylphenyl)ethane.

The aromatic dicarboxylic acids are preferred, in particular terephthalic acid, isophthalic acid and 2,6-naphthalenedicarboxylic acid.

Other suitable dicarboxylic acids are those containing —CO—NH-groups; they are described in DE-A2414349. Dicarboxylic acids containing N-heterocyclic rings are also suitable, for example those which are derived from carboxylalkylated, carboxylphenylated or carboxybenzylated monoamine-s-triazinedicarboxylic acids (viz. DE-A-2121184 and 2533675), mono- or bishydantoins, optionally halogenated benzimidazoles or parabanic acid. The carboxyalkyl group can in this case contain 3 to 20 carbon atoms.

Suitable aliphatic diols are the linear and branched aliphatic glycols, in particular those containing 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is e.g. 1,4-dihydroxycyclohexane. Other suitable aliphatic diols are e.g. 1,4-bis(hydroxymethyl)cyclohexane, aromatic-aliphatic diols such as p-xylylene glycol or 2,5-dichloro-p-xylylene glycol, 2,2-(β-hydroxyethoxyphenyl)propane and also polyoxyalkylene glycols such as diethylene glycol, triethylene glycol, polyethylene glycol or polypropylene glycol. The alkylene diols are preferably linear and preferably contain 2 to 4 carbon atoms.

Preferred diols are the alkylenediols, 1,4-dihydroxycyclohexane and 1,4-bis(hydroxymethyl)-cyclohexane. Particularly preferred are ethylene glycol, 1,4-butanediol and 1,2- and 1,3-propylene glycol.

Other suitable aliphatic diols are the β-hydroxyalkylated, in particular β-hydroxyethylated, bisphenols such as 2,2-bis[4'-(β-hydroxyethoxy)phenyl]propane. Other bisphenols will be mentioned later.

Another group of suitable aliphatic diols are the heterocyclic diols described in DE-A-1812003, DE-A-2342432, DE-A-2342372 and DE-A-2453326, for example: N,N'-bis(β-hydroxyethyl)-5,5-dimethylhydantoin, N,N'-bis(α-hydroxypropyl)-5,5-dimethylhydantoin, methylenebis[N-(β-hydroxyethyl)-5-methyl-5-ethylhydantoin], methylenebis[N-(β-hydroxyethyl)-5,5-dimethylhydantoin],N,N'-bis(β-hydroxyethyl)benzimidazolone, N,N'-bis(β-hydroxyethyl)-(tetrachloro)benzimidazolone or N,N'-bis(β-hydroxyethyl)-(tetrabromo)benzimidazolone.

Suitable aromatic diols are mononuclear diphenols and, in particular dinuclear diphenols carrying a hydroxyl group at each aromatic nucleus. Aromatic will be taken to mean preferably hydrocarbonaromatic radicals, such as phenylene or naphthylene. Besides e.g. hydro-quinone, resorcinol or 1,5-, 2,6- and 2,7-dihydroxynaphthalene, the bisphenols are to be mentioned in particular, which can be represented by the following formulae:

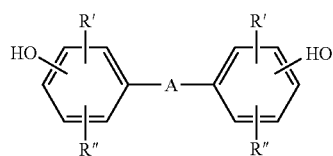

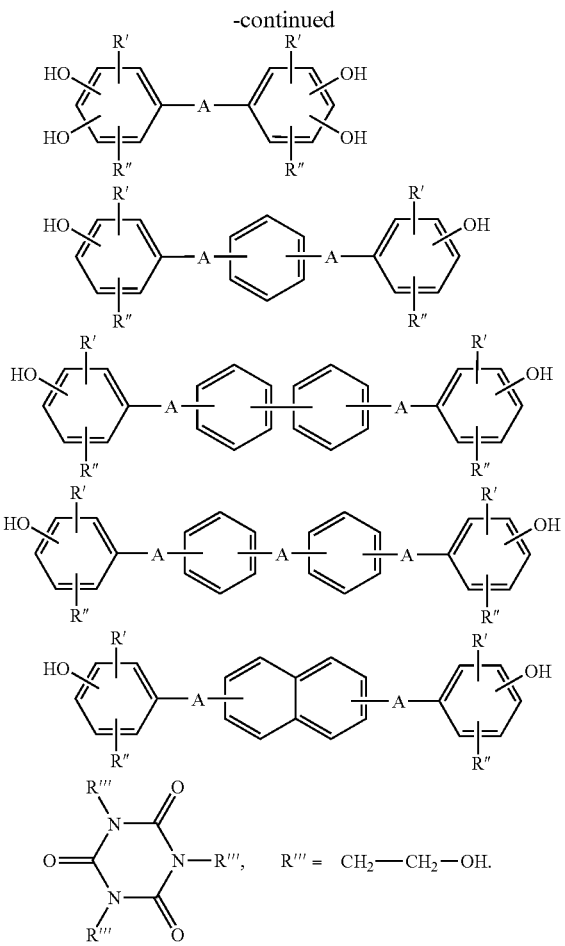

The hydroxyl groups can be in m-position, preferably in p-position, and R' and R" in these formulae can be alkyl containing 1 to 6 carbon atoms, halogen, such as chloro or bromo, and, in particular, hydrogen atoms. A may be a direct bond or —O—, —S—, —(O)S(O)—, —C(O)—, —P(O)($C_1$-$C_{20}$alkyl)-, unsubstituted or substituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloroethylidene, trichloroethylidene.

Examples of unsubstituted or substituted alkylene are methylene, ethylene, phenylmethylene, diphenylmethylene, methylphenylmethylene. Examples of cycloalkylidene are cyclopentylidene, cyclohexylidene, cycloheptylidene and cyclooctylidene.

Examples of bisphenols are: bis(p-hydroxyphenyl)ether or bis(p-hydroxyphenyl)thioether, bis(p-hydroxyphenyl)sulfone, bis(p-hydroxyphenyl)methane, bis(4-hydroxyphenyl)-2,2'-biphenyl, phenylhydroquinone, 1,2-bis(p-hydroxyphenyl)ethane, 1-phenylbis(p-hydroxyphenyl)ethane, diphenylbis(p-hydroxyphenyl)methane, diphenylbis(p-hydroxyphenyl)ethane, bis(3,5-dimethyl-4-hydroxyphenyl) sulfone, bis(3,5-dimethyl-4-hydroxyphenyl)-p-diisopropylbenzene, bis(3,5-dimethyl-4-hydroxyphenyl)-m-diisopropylbenzene 2,2-bis(3',5'-dimethyl-4'-hydroxyphenyl)propane, 1,1- or 2,2-bis(p-hydroxyphenyl)butane, 2,2-bis(p-hydroxyphenyl)hexafluoropropane, 1,1-dichloro- or 1,1,1-trichloro-2,2-bis(p-hydroxyphenyl)ethane, 1,1-bis (p-hydroxyphenyl)cyclopentane and, in particular, 2,2-bis(p-hydroxyphenyl)propane (bisphenol A) and 1,1-bis(p-hydroxyphenyl)cyclohexane (bisphenol C).

Suitable polyesters of hydroxycarboxylic acids are, for example, polycaprolactone, polypivalolactone or the polyesters of 4-hydroxycyclohexancarboxylic acid, 2-hydroxy-6-naphthalene carboxylic acid or 4-hydroxybenzoic acid.

Specifically useful single compounds are summarized in Table A.

TABLE A

| No. | Formula |
| --- | --- |
| 101 | |
| 102 | |
| 103 | |
| 104 | |

TABLE A-continued
| No. | Formula |
|---|---|
| 105 | 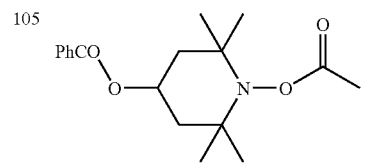 |
| 106 | 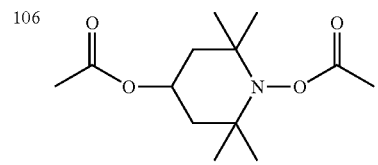 |
| 107 | 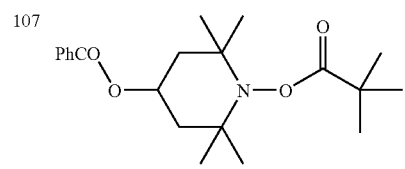 |
| 108 | 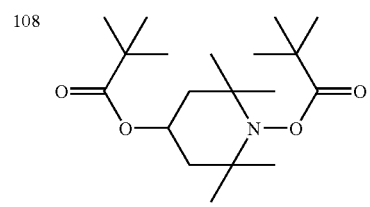 |
| 109 | 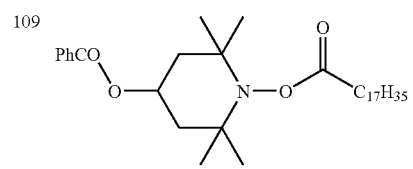 |
| 110 | 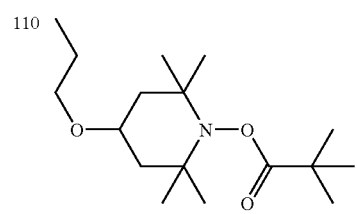 |
| 111 | 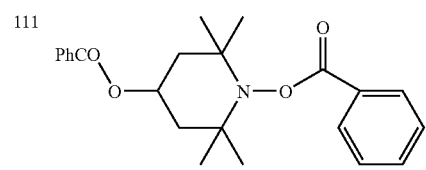 |
| 112 | 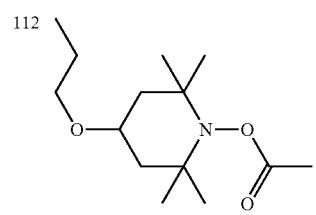 |

TABLE A-continued
| No. | Formula |
|---|---|
| 113 | 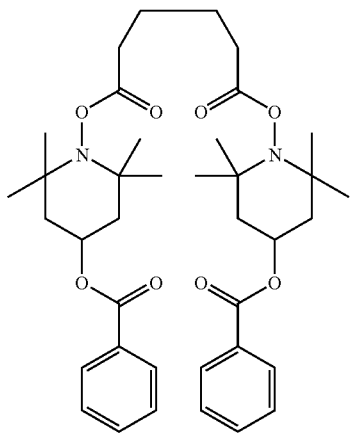 |
| 114 | 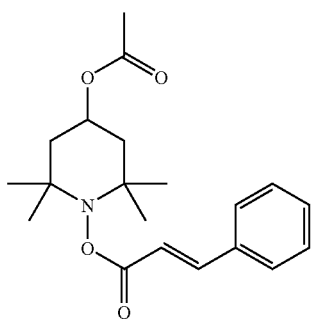 |
| 115 | 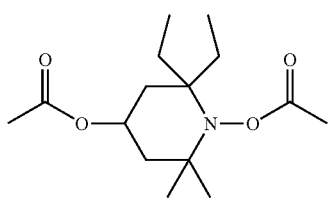 |
| 116 | 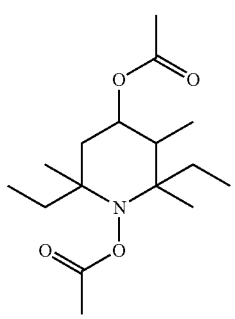 |

TABLE A-continued

| No. | Formula |
|-----|---------|
| 117 | |
| 118 | |
| 119 | |
| 120 | |
| 121 | |
| 122 | |

TABLE A-continued
| No. | Formula |
|---|---|
| 123 | 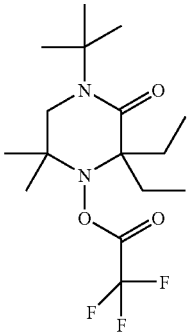 |
| 124 | 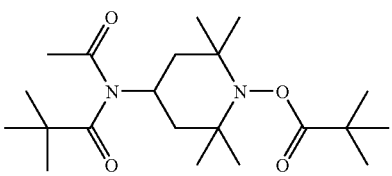 |
| 125 | 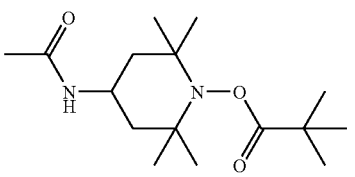 |
| 126 | 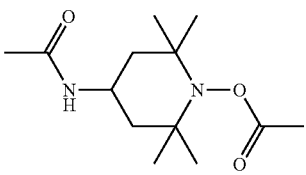 |
| 127 | 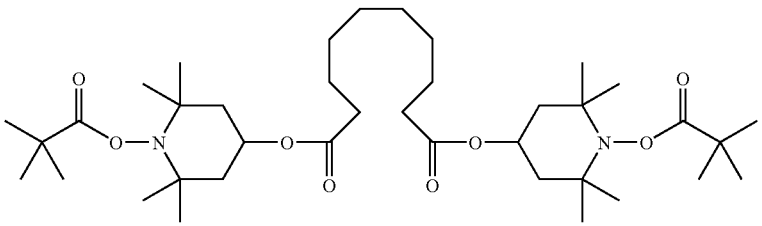 |
| 128 | 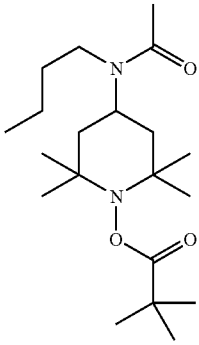 |

TABLE A-continued
| No. | Formula |
|-----|---------|
| 129 | 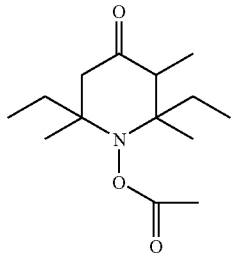 |
| 130 | 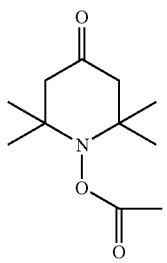 |
| 131 | 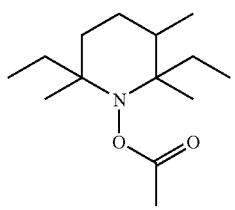 |
| 132 | 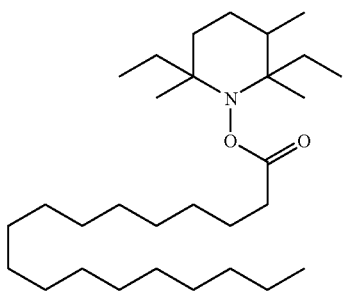 |
| 133 | 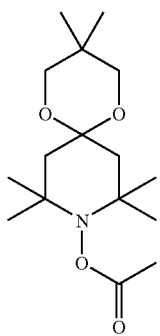 |

TABLE A-continued
| No. | Formula |
|---|---|
| 134 | 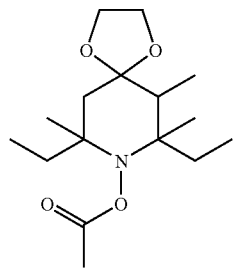 |
| 135 | 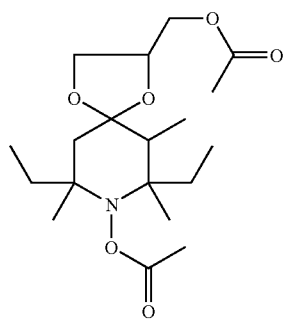 |
| 136 | 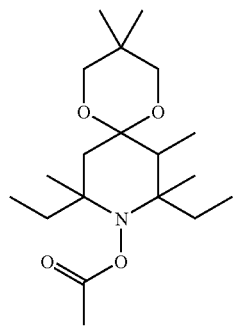 |
| 137 | 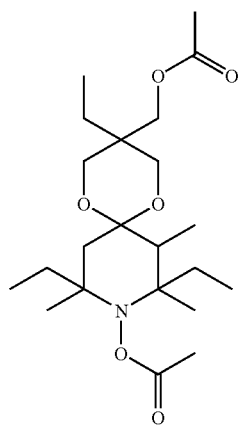 |

TABLE A-continued
| No. | Formula |
|---|---|
| 138 | 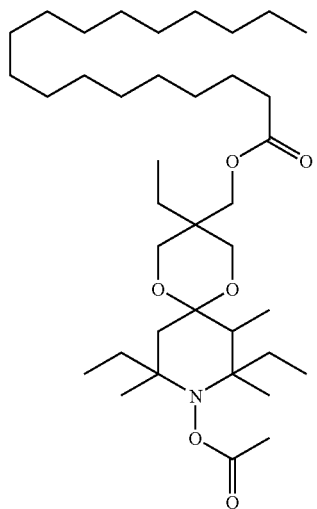 |
| 139 | 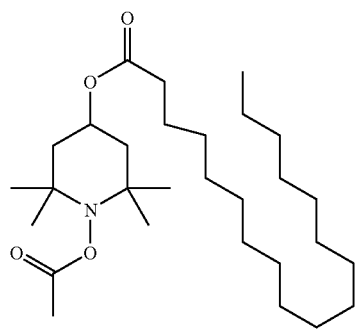 |
| 140 | 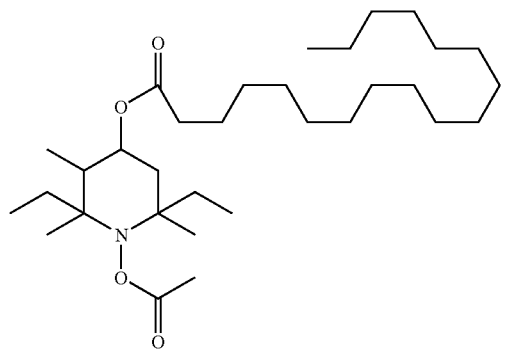 |
| 141 | 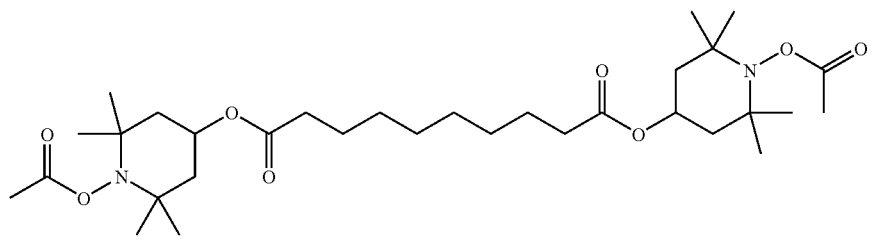 |

TABLE A-continued
| No. | Formula |
|---|---|
| 142 | 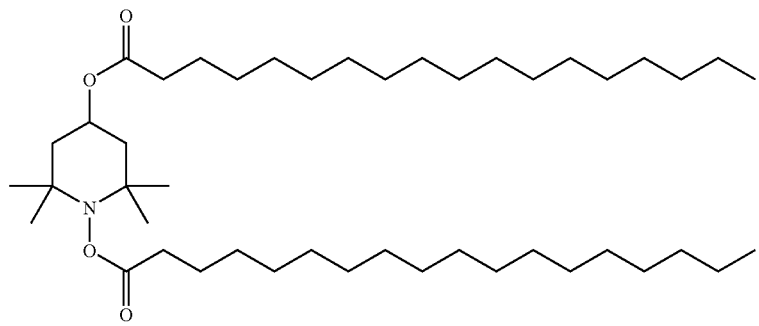 |
| 143 | 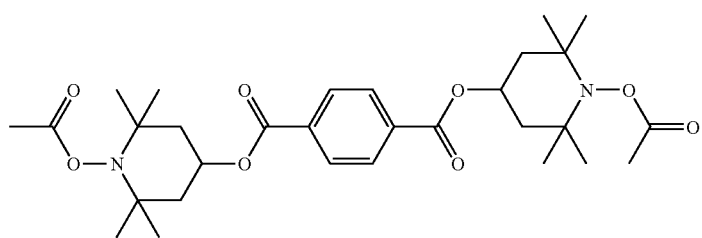 |
| 144 | 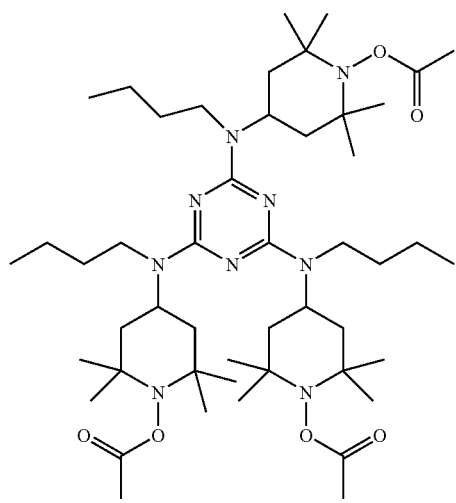 |
| 145 | 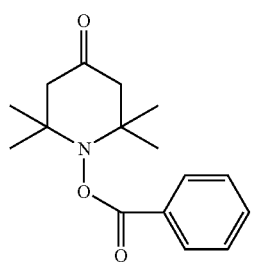 |

TABLE A-continued

| No. | Formula |
|---|---|
| 146 | 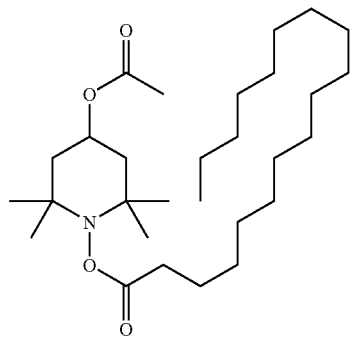 |
| 147 | 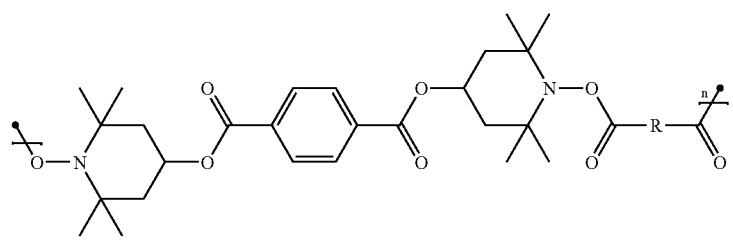 |
| 148 | 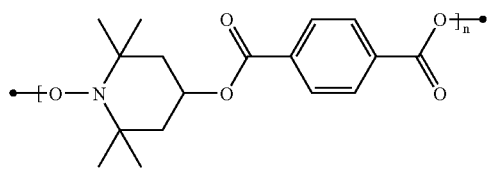 |

In the Table, Ph is the abbreviation for phenyl. Most preferred are compounds 106, 116 and 138.

The preparation of the instant hydroxylamine ester precursors are for example disclosed in following U.S. Pat. Nos. 4,590,231, 5,300,647, 4,831,134, 5,204,473, 5,004,770, 5,096,950, 5,021,478, 5118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, 5,300,544.

The hydroxylamines are reacted with a suitable acid derivative to form the final hydroxylamine ester. Such esterification processes are known and described in the chemical literature.

The preparation of particularly suitable compounds is described in the International Patent Application WO 01/90113.

Preferably the hydroxylamine ester is present in an amount of from 0.1 to 15 weight-%, more preferably of from 0.5 to 10 weight-% and most preferably of from 0.5 to 5 weight-% based on the weight of the polymer.

Suitable polymers, which can be made flame retardant according to the present invention are mentioned below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethyleneacrylic acid copolymers (EM), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethytene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Blends of the aforementioned polymers (polyblends), for example PP/EPDM, Poly-amide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

While the polymeric substrate can be any of a wide variety of polymeric types including polyolefins, polystyrenics, polyesters, polyamides, polyurethanes, and PVC, the polymer substrate is preferably selected from the group of resins consisting of the polyolefins, the thermoplastic olefins, styrenic polymers and copolymers and blends or mixtures thereof.

Particularly preferred is polypropylene, polyethylene, thermoplastic olefin (TPO), polystrene, ABS, high impact polystyrene, expandable polystyrene (EPS) and extrusion foamed polystyrene.

The physical form of the polymeric substrates can be of a wide variety including films, fibers, injection molded parts, extrusion articles, blow molded articles, particle foams, extrusion foams, injection molded foams.

Particularly preferred are foamed articles from polymers based on styrene, ethylene, propylene and EPDM.

Most preferred are compositions of EPS (expandable polystyrene), where the additives can be added in each step between start of styrene polymerization and foaming the EPS beads. Another preferred embodiment is XPS (extrusion foamed polystyrene), where the additives can be added during each step of melt processing and foaming the polystyrene.

Foams can be in general produced by blowing polymer beads or by extrusion or injection molding using chemical or physical blowing agents. Polystyrene based foams are mostly produced by foaming expandable polystyrene (EPS), typically at around 120° C., or by melt extrusion of polystyrene, typically at a temperature above 180° C., together with a physical or chemical blowing agent (extrusion foamed polystyrene=XPS).

Expandable polystyrene (EPS) is produced in suspension polymerization of styrene adding for example pentane as physical blowing agent. To achieve flame retardancy, brominated flame-retardants (e.g. hexabromocyclododecane) and optionally peroxides as fire retardant synergists (e.g. dicumyl peroxide) are added during styrene suspension polymerization (see for example WO 98/51735 or U.S. Pat. No. 4,272,583 and references cited therein). These fire retardant synergists (peroxides) decompose at temperature above 140° C. and loose their flame retardant activity. Therefore, it is not possible to use them in foam extrusion processes (XPS) because processing temperatures are commonly above the peroxides' decomposition temperatures.

As the herein disclosed new systems can be melt processed without decomposition, flame retardant synergism can be realized in foam extrusion processes, as well.

The conventional flame retardant component (ii) is preferably selected from the group consisting of tetraphenyl resorcinol diphosphite (FYROLFLEX® RDP)
chloroalkyl phosphate esters (ANTI BLAZE® AB-100 or FYROL® FR-2)
polybrominated diphenyl oxide (DE-60F)
decabromodiphenyl oxide (DBDOP),
antimony trioxide ($Sb_2O_3$),
antimony pentoxide ($Sb_2O_5$),
tris[3-bromo-2,2-(bromomethyl)propyl] phosphate (PB 370®),
triphenyl phosphate,
bis(2,3-dibromopropyl ether) of bisphenol A (PE68),
ammonium polyphosphate (APP) or (HOSTAFLAM® AP750),
resorcinol diphosphate oligomer (RDP),
brominated epoxy resin,
tetrabromobisphenol A-bis-(allyl ether),
hexabromocyclododecane,
dibromocyclohexane
tribromophenol-cyanurate (Dead Sea® FR-245)
thylene-bis(tetrabromophthalimide) (BT93),
bis(hexachlorocyclopentadieno)cyclooctane (DECLORANE PLUS®),
calcium sulfate
chlorinated paraffins,
magnesium carbonate,
melamine phosphates,
melamine pyrophosphates,
molybdenum trioxide,
zinc oxide,
1,2-bis(tribromophenoxy)ethane (FF680),
tetrabromo-bisphenol A (SAYTEX® RB100),
Saytex® BC-56HS (Albemarle) BC-56HS (Albemarle)
magnesium hydroxide,
alumina trihydrate,
zinc borate, and
ethylenediamine diphosphate (EDAP).
Oligomeric diisopropyl benzene The conventional flame retardants may also be mixtures of the above mentioned classes.

Most preferred is tris[3-bromo-2,2-(bromomethyl)propyl] phosphate (PB370), hexabromocyclododecane, tetrabromobisphenol A-bis-(allyl ether), dibromocyclohexane and Saytex BC-56HS (Albemarle).

The conventional flame retardant component (ii) is preferably present in an amount of from 0.1 to 30 weight-%, more preferably from 1 to 15 weight-% based on the weight of the polymer.

The ratio by weight between component (i) and (ii) is preferably from 10:1 to 1:100, more preferably from 5:1 to 1:20 and most preferably from 2:1 to 1:10.

In another embodiment of the invention it is advantageous that an organic peroxide and/or another radical generator is additionally present.

An example for an organic peroxide is dicumyl peroxide, an example for another radical generator is oligomeric diisopropylbenzene, which is frequently used in EPS, as described for example in WO 98/51735.

Besides the afore mentioned components a further additive selected from the group consisting of a UV absorber, a sterically hindered amine, a phenolic antioxidant, a phosphite or phosphonite and a benzofuranone or an indolinone can be additionally present.

Suitable examples are mentioned below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydrocuinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, noctanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-(3-(3-tert-butyl-4-hydroxy-5-methylphenyl)propionyloxy)-1,1-dimethylethyl]-2,4,8,10-tetraoxaspiro[5.5]-undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic Acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl)nitrilotriacetate, tetrakis(2, 2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyl-oxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis (3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2, 5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4, 6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2, 6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1.3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethyl-phenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2, 4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1, 3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred: Tris(2, 4-di-tert-butylphenyl)phosphite (Irgafos® 168, Ciba Specialty Chemicals), tris(nonylphenyl)phosphite,

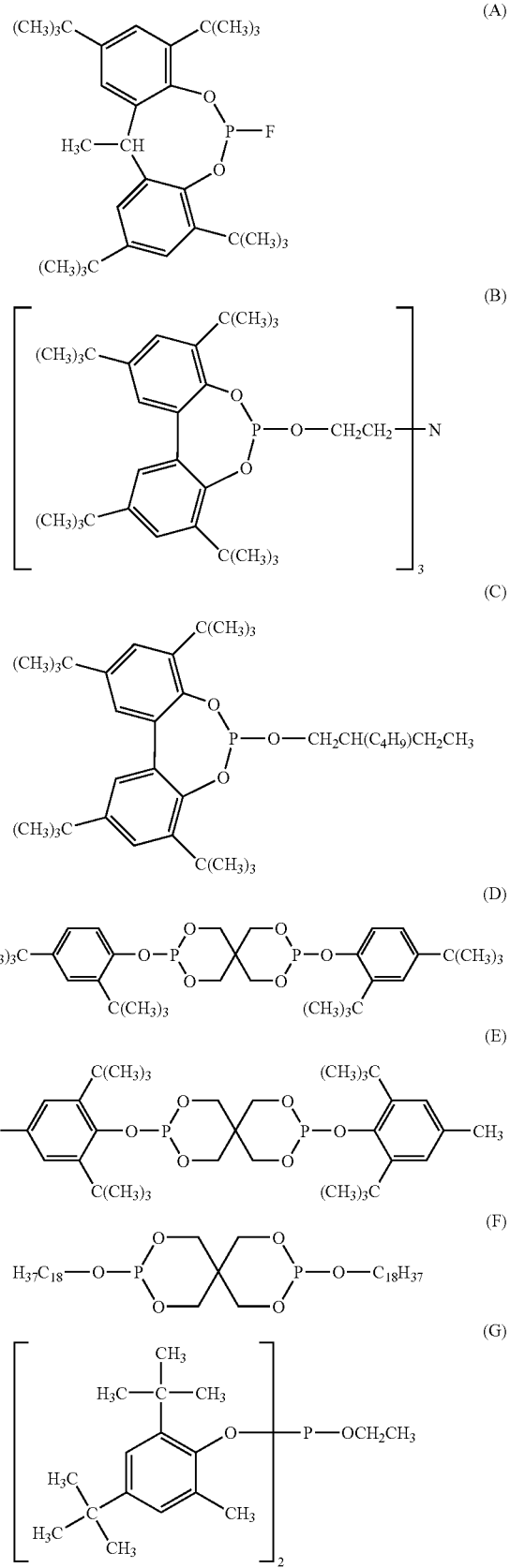

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Polyamide stabilisers, for example copper salts in combination with iodides and/or phosphorus compounds and salts of divalent manganese.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, antistatic agents and blowing agents.

13. Benzofuranones and indolinones, for example those disclosed in U.S. Pat Nos. 4,325,863; 4,338,244; 5,175,312; 5,216,052; 5,252,643; DE-A-4316611;

DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

A further aspect of the invention is a method of making a thermoplastic polymer flame retarding by incorporating into the thermoplastic polymer
a mixture of
(i) a hydroxylamine ester having a structural element of formula (I) or formula (I') or with a polymeric hydroxylamine ester having a repetitive structural unit of formula (II) or (II')

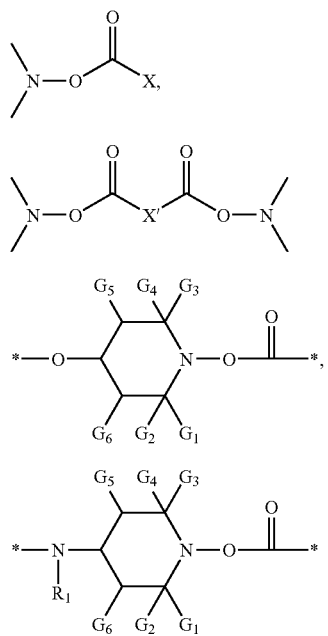

wherein
X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylene, $C_2$-$C_{36}$alkenylen, $C_2$-$C_{36}$alkinylene, —($C_1$-$C_6$alkylene)-phenylene-($C_1$-$C_6$alkylene)- or a group from a dimer acid;

$G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$-$C_4$ alkyl;

$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl; and (ii) a flame retardant compound selected from the group consisting of halogenated, phosphorus, boron, silicon and antimony compounds, metal hydroxides, metal hydrates, metal oxides and mixtures thereof.

The definitions and preferences given above apply also to the method.

The additives of the invention and optional further components may be added to the polymer material individually or mixed with one another. If desired, the individual components can be mixed with one another before incorporation into the polymer for example by dry blending, compaction or in the melt.

The incorporation of the additives of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc), e.g. as a dry mixture or powder or as solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffex-trusion*, Vol. 1 Grundlagen, Editors F. Hensen, W. Knappe, H. Potente, 1989, pp. 3-7, ISBN:3-446-14339-4 (Vol. 2 *Extrusionsanlagen* 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additives of the invention and optional further additives can also be sprayed onto the polymer material. They are able to dilute other additives (for example the conventional additives indicated above) or their melts so that they can be sprayed also together with these additives onto the material. Addition by spraying during the deactivation of the polymerization catalysts is particularly advantageous; in this case, the steam evolved may be used for deactivation of the catalyst. In the case of spherically polymerized polyolefins it may, for example, be advantageous to apply the additives of the invention, optionally together with other additives, by spraying.

The additives of the invention and optional further additives can also be added to the polymer in the form of a masterbatch ("concentrate") which contains the components in a concentration of, for example, about 1% to about 40% and preferably 2% to about 20% by weight incorporated in a polymer. The polymer must not be necessarily of the identical structure as the polymer where the additives are added finally. In such operations, the polymer can be used in the form of a powder, granules, solutions, suspensions or in the form of latices.

Incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the additives of the invention into polymers is to add them before, during or directly after the polymerization of the corresponding monomers or prior to crosslinking. In this context the additive of the invention can be added as it is or else in encapsulated form (for example in waxes, oils or polymers).

The materials containing the additives of the invention described herein can be used for the production of moldings, rotomolded articles, injection molded articles, blow molded articles, films, tapes, mono-filaments, fibers, nonwovens, profiles, adhesives or putties, surface coatings and the like.

Yet a further aspect of the invention is a flame retardant mixture comprising
(i) a hydroxylamine ester having a structural element of formula (I) or formula (I') or with a polymeric hydroxylamine ester having a repetitive structural unit of formula (II) or (II')

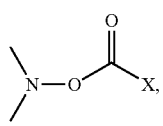
(I)

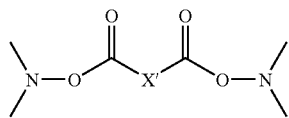
(I')

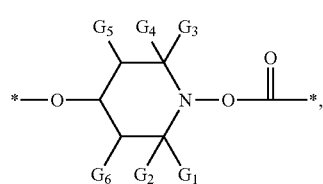
(II)

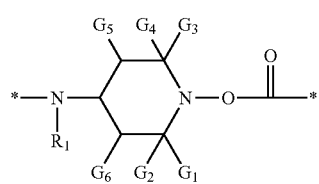
(II')

wherein
X is hydrogen, $C_1$-$C_{36}$alkyl, $C_2$-$C_{36}$alkenyl, $C_2$-$C_{18}$alkinyl, $C_6$-$C_{10}$aryl, —O—$C_1$-$C_{18}$alkyl, —O—$C_6$-$C_{10}$aryl, —NH—$C_1$-$C_{18}$alkyl, —NH—$C_6$-$C_{10}$aryl, —N($C_1$-$C_6$alkyl)$_2$;

X' is a direct bond or $C_1$-$C_{36}$alkylene, $C_2$-$C_{36}$alkenylene, $C_2$-$C_{36}$alkinylene, —($C_1$-$C_6$alkylene)-phenylene-($C_1$-$C_6$alkylene)- or a group from a dimer acid;

$G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$-$C_4$ alkyl;

$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl; and (ii) a flame retardant compound selected from the group consisting of halogenated, phosphorus, boron, silicon and antimony compounds, metal hydroxides, metal hydrates, metal oxides and mixtures thereof.

The use of a synergistic mixture as defined above as flame retarding additive for thermoplastic polymer articles and the use of a hydroxylaminester itself as flame retarding additive for thermoplastic polymer articles are further aspects of the invention.

All definitions and preferences given above apply also to these aspects of the invention.

The following examples illustrate the invention.

A) EXAMPLES A1-A8 AND COMPARATIVE EXAMPLES RA1-RA7 IN POLYSTYRENE

Materials:
Polystyrene 165H ex BASF
Dead Sea FR-245 (=tribromophenol-cyanurate) Antiox 80/20 ex Campine (80% antimony trioxides masterbatch in polystyrene)
DCUP (=dicumylperoxide) as delivered by Aldrich
Used Hydroxylamine Ester

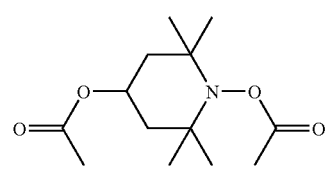
Compound 106

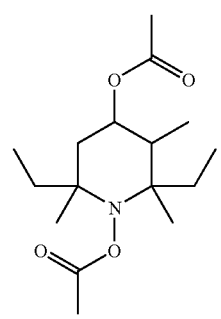
Compound 116

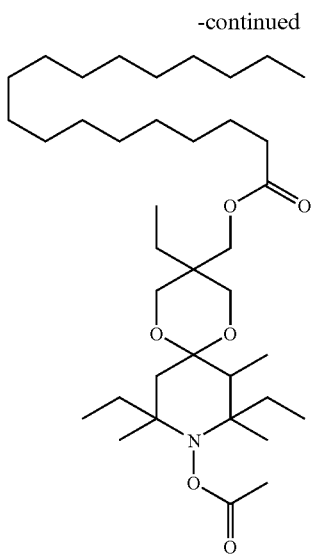

Compound 138

Standard Procedures:

The compositions were dry-blended and gravimetrically metered into a twin-screw extruder W&P ZSK25. The material was extruded at following conditions:
Temperature Zone 1-6: 200° C.
Throughput: 6 kg/h
Screw speed (RPM): 100/min
Temperature Melt Dye: 197-199° C.
Dye Melt Pressure: 6-22 bar
Torque: 37-56%

Subsequently, the material was granulated to give uniform pellets. The pellets were injection molded twice to form two defined test bar dimensions at following conditions:

| Plaques dimensions 100 x 100 x 3 mm (LOI) | UL-test bar dimensions 127 x 12.7 x 0.8 mm |
|---|---|
| Arburg 270-210-500 | Arburg 220-350-90 |
| Cylinder Temp Zone 1-3 220-240° C. | Cylinder Temp Zone 1-4 205-220° C. |
| Temp Dye 240° C. | Temp Dye 205° C. |
| Mould Temperature 56-57° C. | Mould Temperature 66-68° C. |
| Mould Cooling Time 16 s | Mould Cooling Time 7-9 s |
| Injection Pressure 600-800 bar | Injection Pressure 1050-1200 bar |
| Holding Pressure 450 bar | Holding Pressure 700-800 bar |
| Back Pressure 50-80 bar | Back Pressure 85-100 bar |
| Back Pressure Time 10 s | Holding Pressure Time 3.5-5 s |
| Injection Speed 50 Scale units | Injection Speed 75-80 ccm/s |
| Injection Time 0.5-0.6 s | Injection Time 0.18-0.23 s |

Test Procedures:
MFR according to ISO 1133 using Göttfert MP-D
LOI per ASTM D2863 BS2782 PART 141 ISO 4589
Determination of Flammability by Oxygen Index
UL94-Tests UL94 horizontal and vertical Bunsen burner tests and associated international standards:

1. Horizontal Burning Test; UL 94HB (ASTM D 5048 or ISO 10351).
2. Vertical Burning Test; UL 94V-0, V-1, or V-2 (ASTM D 3801, IEC 707, or ISO 1210).

Following compositions were extruded, injection molded and tested at described standard procedures (examples 1 to 8 and comparative example (references) 1 to 7):

TABLE 1

| No. | Formulation | LOI (% O2) |
|---|---|---|
| Reference RA1 | 100% Polystyrol 165 H | 18.4 |
| Example A1 | 100% Polystyrol 165 H 1% compound 106 | 19.1 |
| Example A2 | 100% Polystyrol 165 H 1% compound 116 | 18.9 |

The hydroxylamine ester alone slightly increases LOI.

TABLE 2

| No. | Formulation | LOI (% O2) | Burn time UL94 (sec.) | UL94 classification |
|---|---|---|---|---|
| Reference RA2 | 100% Polystyrol 165 H 10% Dead Sea FR-245 | 21.3 | 14 | V-2 |
| Example A3 | 100% Polystyrol 165 H 10% Dead Sea FR-245 1% compound 106 | 22.7 | 6 | V-2 |
| Example A4 | 100% Polystyrol 165 H 10% Dead Sea FR-245 1% compound 116 | 21.9 | 3 | V-2 |
| Reference RA3 | 100% Polystyrol 165 H 10% Dead Sea FR-245 3.75% Antiox 80/20 | 21.2 | 28 | |
| Example A5 | 100% Polystyrol 165 H 10% Dead Sea FR-245 3.75% Antiox 80/20 0.5% compound 106 | 21.9 | 2.5 | V-2 |
| Example A6 | 100% Polystyrol 165 H 10% Dead Sea FR-245 3.75% Antiox 80/20 1% compound 106 | 22.6 | Invalid | |

TABLE 2-continued

| No. | Formulation | LOI (% O2) | Burn time UL94 (sec.) | UL94 classification |
|---|---|---|---|---|
| Example A7 | 100% Polystyrol 165 H 10% Dead Sea FR-245 3.75% Antiox 80/20 0.5% compound 116 | 22.1 | 6 | V-2 |
| Example A8 | 100% Polystyrol 165 H 10% Dead Sea FR-245 3.75% Antiox 80/20 1% compound 116 | 23.0 | 1.3 | V-2 |

LOI is significantly increased and burn time is substantially reduced by combining classical flame-retardants with the instant hydroxylamine esters.

Table 3 shows the negative influence of peroxides on processing properties in terms of melt flow. The compositions according to this invention show no significant increase of MFR.

TABLE 3

| No. | Formulation | MFR (200/5) |
|---|---|---|
| Reference RA4 | 100% PS 165 H; injection molded w/o prior extrusion | 3.5 |
| Reference RA1 | 100% Polystyrol 165 H | 3.5 |
| Reference RA5 | 100% Polystyrol 165 H 1% DCUP | 51 |
| Example A1 | 100% Polystyrol 165 H 1% compound 106 | 5.9 |
| Example A2 | 100% Polystyrol 165 H 1% compound 116 | 5.9 |
| Reference RA2 | 100% Polystyrol 165 H 10% Dead Sea FR-245 | 11 |
| Reference A6 | 100% Polystyrol 165 H 10% Dead Sea FR-245 1% DCUP | 39 |
| Example A3 | 100% Polystyrol 165 H 10% Dead Sea FR-245 1% compound 106 | 11 |
| Reference A3 | 100% Polystyrol 165 H 10% Dead Sea FR-245 3.75% Antiox 80/20 | 7.2 |
| Reference A7 | 100% Polystyrol 165 H 10% Dead Sea FR-245 3.75% Antiox 80/20 0.5% DCUP | 36 |
| Example RA6 | 100% Polystyrol 165 H 10% Dead Sea FR-245 3.75% Antiox 80/20 1% compound 106 | 6.6 |

B) EXAMPLES B1-B2 AND COMPARATIVE EXAMPLE RB1 IN POLYSTYRENE

Materials:
Polystyrene 165 H crystal clear ex BASF
Irganox B921 ex Ciba Specialty Chemicals
Calcium-stearate ex Aldrich
HBCD (=Hexabromocyclododecane (1,2,5,6,9,10-)) ex Aldrich
Hydroxylaminester: Compound 138
Standard Procedures:

The compositions were dry-blended and gravimetrically metered into a twin-screw extruder W&P ZSK25. The material was extruded at following conditions:
Temperatures:

| | setting: | observed: |
|---|---|---|
| Zone 1 | 180° C. | 178° C. |
| Zone 2 | 190° C. | 189° C. |
| Zone 3 | 190° C. | 191° C. |
| Zone 4 | 192° C. | 190° C. |
| Zone 5 | 191° C. | 190° C. |
| Zone 6 | 193° C. | 191° C. |
| Melt (die) | | 190° C. |

Throughput: 6 kg/h
Screw speed (RPM): 100/min
Dye Melt Pressure: 14-25 bar
Torque: 7-25%

Subsequently, the material was granulated to give uniform pellets. The pellets were injection molded, as follows:

| UL-test bar dimensions 127 × 12.7 × 1.6 mm | |
|---|---|
| Arburg | 270-210-500 |
| Cylinder Temp Zone 1-3 | 184-195° C. |
| Temp Dye | 200° C. |
| Mould Temperature | 42° C. |
| Mould Cooling Time | 12 s |
| Injection Pressure | 600-750 bar |
| Holding Pressure | 450 bar |
| Back Pressure | 63 bar |
| Back Pressure Time | 6 s |
| Injection Speed | 35 Scale units |

Test Procedures:
UL94-Tests
UL 94 horizontal Bunsen burner tests and associated international standards:
Horizontal Burning Test; UL 94HB (ASTM D 5048 or ISO 10351).

Following compositions were extruded, compression molded and; tested at described standard procedures (examples B1 and B2 and comparative example (reference B1):

TABLE 4

| No | PS 195 H | Ix. B921 | Ca-stearate | HBCD | Compound 138 | V2 class. | Average burn time |
|---|---|---|---|---|---|---|---|
| Reference RB1 | 100 | 0.1 | 0.1 | 2 | — | Not classified | 73 sec |
| Example B1 | 100 | 0.1 | 0.1 | 1 | 1 | Yes | 2 sec |
| Example B2 | 100 | 0.1 | 0.1 | 1 | 0.5 | Yes | 5 sec |

Combining brominated flame retardants with hydroxylaminesters results in synergistically better flame retardant properties.

C) EXAMPLES C1-C3 AND COMPARATIVE EXAMPLES RC1-RC2 IN EXTRUSION FOAMED POLYSTYRENE

Materials:
Polystyrene 165 H crystal clear ex BASF
Irganox B921 ex Ciba Specialty Chemicals
Calcium-stearate ex Aldrich
HBCD (=Hexabromocyclododecane (1,2,5,6,9,10-)) ex Aldrich
Luvopor 9575 VP ex Lehmann&Voss
Hydroxylamineester: Compound 138
Standard Procedures:

The compositions were dry-blended and gravimetrically metered into a twin-screw extruder Haake TW100 Rheocord. The material was extruded at following conditions:
Temperatures:

| | setting: | observed: |
|---|---|---|
| Zone 1 | 160° C. | 184° C. |
| Zone 2 | 195° C. | 191° C. |

-continued

| | setting: | observed: |
|---|---|---|
| Zone 3 | 164° C. | 191° C. |
| Zone 4 | 138° C. | n.a. |
| Zone 5 | 182° C. | 191° C. |

Screw speed (RPM): 40/min
Dye Melt Pressure: 8-46 bar
Torque: 8-48 Nm
The strand foams directly after leaving the die. Foam density: 400 g/l
Test Procedures:
Analogous UL94-Tests
UL 94 horizontal Bunsen burner tests and associated international standards:
Horizontal Burning Test; UL 94HB (ASTM D 5048 or ISO 10351).
Following compositions were extruded, and tested at described standard procedures (examples XPS1/XPS2/XPS3 and comparative example (references) XPS-$C_1$ and XPS-$C_2$):

TABLE 5

| No | PS 195 H | Ix. B921 | Ca-stearate | HBCD | Compound 138 | Luvopor 9575 VP | Average burn rate [mm/min] |
|---|---|---|---|---|---|---|---|
| Reference RC1 | 100 | 0.1 | 0.1 | 2 | — | 2 | 4.5 |
| Reference RC2 | 100 | 0.1 | 0.1 | 3 | — | 2 | 2.6 |
| Example C1 | 100 | 0.1 | 0.1 | 2 | 0.2 | 2 | 2.8 |
| Example C2 | 100 | 0.1 | 0.1 | 2 | 1 | 2 | 1.8 |
| Example C3 | 100 | 0.1 | 0.1 | 2 | 2 | 2 | 1.2 |

Combining brominated flame retardants with hydroxylamineester in foamed polystyrene results in synergistically better flame retardant properties.

D) EXAMPLE D1 AND COMPARATIVE EXAMPLE RD1 IN SUSPENSION POLYSTYRENE

COMPARATIVE EXAMPLE, REFERENCE RD1

Materials:
Solution A1:
104 g styrene, 99% (ex Merck)
0.2176 g Peroxan PO 98% (tert.butylperoxy-2-ethylhexanoate ex Pergan)
0.5407 g dicumylperoxide (ex Merck)
1 g tribromo-phenolcyanurate FR-245 (ex Dead-Sea)
7.17 g pentane (ex Merck)
Solution B:
6 g polyvinylalcohol 98% MW13-23,000 (ex Aldrich), dissolved at 90° C. in 300 g de-ionized water
Polymerization is carried out in a double wall three neck flask with reflux condenser, pressuring and vacuum unit and stirrer. The mixtures/solutions are degassed with argon. Solution A1 and solution B are filled into the reactor under nitrogen atmosphere and stirring with 200 rounds per minute. The pressure is increased to 4 bars, the mixture is stirred with 600 rounds per minute and heated within 45 min. to 90° C. The reaction mixture is kept at 90° C. for 4 hours. The temperature is increased within 30 min to 110° C. and kept for further 90 min. at 110° C. Before emptying the reactor, the mixture is cooled by adding 300 g water (0° C.).

The cooled mixture is filtered, revealing polystyrene particles of 0.75 mm average diameter.
Yield (gravimetrically): 94%
Mn: 101,300 g/mol; Mw: 240,900 g/mol; polydispersity 2.4
Characterization of molecular weight is carried out by size exclusion chromatography from a solution of the polymer in tetrahydrofurane.
The polystyrene particles are foamed by placing them into a sieve, which is put for about 5 min 1 cm above boiling water. The foamed particles were compression molded at 110° C., and bars of 15×80×2 mm dimension for testing flame retardant properties were cut. Foam density of test bars: 67 g/l
Burn time: 11 sec. (average of 6 specimen, test design analogous UL-94 horizontal burning test)

Example D1

The described procedure for synthesizing EPS was repeated with the only difference, using solution A2 instead of solution A1:
Solution A2:
103 g styrene, 99% (ex Merck)
0.2107 g Peroxan PO 98% (tert.butylperoxy-2-ethylhexanoate ex Pergan)
0.5294 g compound 138
1 g tribromo-phenolcyanurate FR-245 (ex Dead-Sea)
7.04 g pentane (ex Merck)
Yield (gravimetrically): 96%
Mn: 94,660 g/mol; Mw: 192,900 g/mol; polydispersity 2.0
Characterization of molecular weight is carried out by size exclusion chromatography from a solution of the polymer in tetrahydrofurane.
The polystyrene particles are foamed by placing them into a sieve, which is put for about 5 min 1 cm above boiling water. The foamed particles were compression molded at 110° C., and bars of 15×80×2 mm dimension for testing flame retardant properties were cut. Foam density of test bars: 78 g/l
Burn time: 5 sec. (average of 6 specimen, test design analogous UL-94 horizontal burning test)
The use of compound 138 instead of dicumylperoxide as flame retardant synergist results in a significantly improved flame retardancy.

E) EXAMPLE E1-E5 AND COMPARATIVE EXAMPLES RE1-RE3 IN POLYPROPYLENE

Materials:
Polypropylene Profax P H 350 ex BaseII
Irganox B225 ex Ciba Specialty Chemicals
Zinkoxid ex Merck
FR-370 Tribromopentylphosphate ex Dead-Sea-Bromine Group
Deca (=Decabromodiphenylether) ex Dead-Sea-Bromine Group DCUP Dicumylperoxide ex Merck
Hydroxylamineester: compound 106 and compound 138.
Standard Procedures:
The compositions were dry-blended and gravimetrically metered into a twin-screw extruder W&P ZSK25. The material was extruded at following conditions:

Temperatures:

|  | setting: | observed: |
|---|---|---|
| Zone 1 | 145° C. | 145° C. |
| Zone 2 | 181° C. | 180° C. |
| Zone 3 | 186° C. | 186° C. |
| Zone 4 | 188° C. | 185° C. |
| Zone 5 | 187° C. | 185° C. |
| Zone 6 | 187° C. | 186° C. |
| Melt (die) |  | 185° C. |

Throughput: 4 kg/h
Screw speed (RPM): 100/min
Dye Melt Pressure: 9-15 bar
Torque: 35-46%
Subsequently, the material was granulated to give uniform pellets. The pellets were compression molded, as follows:
Plaques dimensions 60×60×1 mm
Fontijne table press
Pressure 0,9 MPa
Temperature 190° C.
Procedure:
1 Min preheating
1 Min pressing
1 Min pressure release
3 Min pressing
Test Procedures:
MFR according to ISO 1133 using Göttfert MP-D
UL94-Tests
UL 94 horizontal Bunsen burner tests and associated international standards: Horizontal Burning Test; UL 94HB (ASTM D 5048 or ISO 10351).
Following compositions were extruded, compression molded and tested at described standard procedures (examples E1 to E5 and comparative example (references RE1 to RE3):

TABLE 6

| No | Profax P H 350 | Ix. B225 | Zink-oxide | FR-370 | Comp. 106 | Comp. 138 | V2 class. | Average burn time |
|---|---|---|---|---|---|---|---|---|
| Reference RE1 | 100 | 0.1 | 0.03 | 3.5 | — | — | No | 69 |
| Example E1 | 100 | 0.1 | 0.03 | 3 | 0.5 | — | Yes | 20 |
| Example E2 | 100 | 0.1 | 0.03 | 3 | — | 0.1 | Yes | 9 |
| Reference RE2 | 100 | 0.1 | 0.03 | Deca 5.5 | — | — | No | 75 |
| Example E3 | 100 | 0.1 | 0.03 | 5 | 0.5 | — | Yes | 17 |
| Example E4 | 100 | 0.1 | 0.03 | 5 | — | 0.1 | Yes | 7 |

Combining brominated flame retardants with hydroxylamineesters results in synergistically better flame retardant properties.

TABLE 7

| No | Profax P H 350 | Ix. B225 | Zink-oxide | DCUP | NOR | MFR (230/2.16) | Average burn time |
|---|---|---|---|---|---|---|---|
| Reference RE3 | 100 | 0.1 | 0.03 | 0.1 | — | 51 | 81 |
| Example E5 | 100 | 0.1 | 0.03 | — | 0.5 | 14 | 68 |

Reference RE3 shows the detrimental effect on the MFR when a peroxide is added. This does not occur when hydroxylamineesters are NOR.

The invention claimed is:
1. A flame retardant composition which comprises
(a) a polypropylene substrate and
(b) a mixture of
  (i) a hydroxylamine ester of formula C

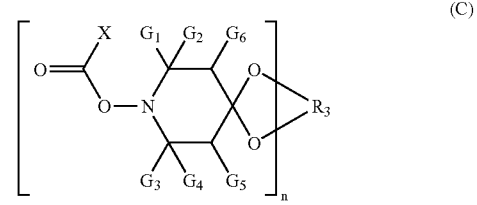

where
$G_1$, $G_2$, $G_3$ and $G_4$ are methyl or $G_1$ and $G_3$ are methyl and $G_2$ and $G_4$ are ethyl;
$G_5$ and $G_6$ are independently hydrogen or methyl;
n is 1;
$R_3$ is $C_2$-$C_8$alkylene or hydroxyalkylene or $C_4$-$C_{36}$acyloxyalkylene and
X is hydrogen, $C_1$-$C_{36}$alkyl or $C_6$-$C_{10}$aryl; and
  (ii) tribrompentylphosphate or decabromodiphenylether.
2. A composition according to claim 1 wherein the hydroxylamine ester is present in an amount of from 0.1 to 15 weight-% based on the weight of the polymer.
3. A composition according to claim 1 wherein the flame retardant compound is present in an amount of from 0.1 to 30 weight-% based on the weight of the polymer.

4. A composition according to claim 1 wherein the ratio by weight between component (i) and (ii) is from 10:1 to 1:100.

5. A composition according to claim 1, which additionally contains an organic peroxide and/or another radical generator.

6. A composition according to claim 1 which additionally contains a further additive selected from the group consisting of a UV absorber, a sterically hindered amine, a phenolic antioxidant, a phosphite or phosphonite and a benzofuranone or an indolinone.

7. A method of making a polypropylene polymer flame retarding by incorporating into the polymer a mixture of (i) a hydroxylamine ester of formula C

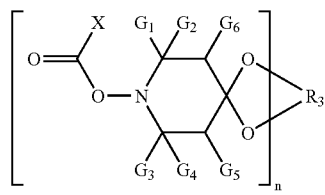

(C)

where $G_1$, $G_2$, $G_3$ and $G_4$ are methyl or $G_1$ and $G_3$ are methyl and $G_2$ and $G_4$ are ethyl;

$G_5$ and $G_6$ are independently hydrogen or methyl;

n is 1;

$R_3$ is $C_2$-$C_8$alkylene or hydroxyalkylene or $C_4$-$C_{36}$acyloxyalkylene and X is hydrogen, $C_1$-$C_{36}$alkyl or $C_6$-$C_{10}$aryl; and (ii) tribromopentylphosphate or decabromodiphenylether.

8. A flame retardant mixture comprising (i) a hydroxylamine ester of formula C

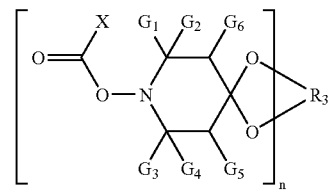

(C)

where $G_1$, $G_2$, $G_3$ and $G_4$ are methyl or $G_1$ and $G_3$ are methyl and $G_2$ and $G_4$ are ethyl;

$G_5$ and $G_6$ are independently hydrogen or methyl;

n is 1;

$R_3$ is $C_2$-$C_8$alkylene or hydroxyalkylene or $C_4$-$C_{36}$acyloxyalkylene and X is hydrogen, $C_1$-$C_{36}$alkyl or $C_6$-$C_{10}$aryl; and (ii) tribromopentylphosphate or decabromodiphenylether.

9. A composition according to claim 1 wherein the hydroxylamine ester of formula (C) is

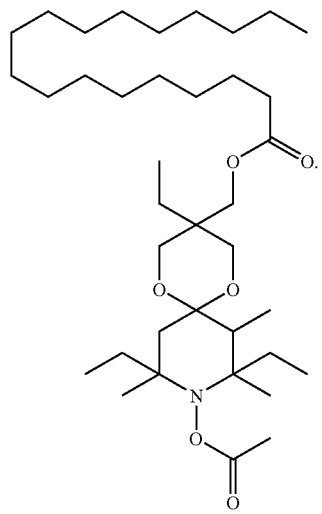

* * * * *